United States Patent
Nock et al.

(10) Patent No.: US 9,221,364 B2
(45) Date of Patent: Dec. 29, 2015

(54) SYNCHRONIZER FOR MANUAL RECLINER

(75) Inventors: Eckhard Nock, Schweitenkirchen (DE); Norbert Hertling, Munich (DE)

(73) Assignee: LEAR CORPORATION, Southfield, MI (US)

( * ) Notice: Subject to any disclaimer, the term of this patent is extended or adjusted under 35 U.S.C. 154(b) by 359 days.

(21) Appl. No.: 13/233,251

(22) Filed: Sep. 15, 2011

(65) Prior Publication Data

US 2012/0086253 A1   Apr. 12, 2012

(30) Foreign Application Priority Data

Oct. 6, 2010   (DE) .......................... 10 2010 042 057

(51) Int. Cl.
- *B60N 2/235* (2006.01)
- *B60N 2/20* (2006.01)
- *B60N 2/22* (2006.01)

(52) U.S. Cl.
CPC ........... *B60N 2/2356* (2013.01); *B60N 2205/50* (2013.01)

(58) Field of Classification Search
CPC ......................... B60N 2/2356; B60N 2205/50
USPC .................. 297/354.12, 367 R, 367 P, 378.12
See application file for complete search history.

(56) References Cited

U.S. PATENT DOCUMENTS

| | | | |
|---|---|---|---|
| 4,076,309 A * | 2/1978 | Chekirda et al. | 297/363 |
| 4,218,092 A | 8/1980 | Schach et al. | |
| 4,863,219 A | 9/1989 | Ochiai | |
| 5,161,856 A * | 11/1992 | Nishino | 297/367 R |
| 5,224,759 A | 7/1993 | Matsuura et al. | |
| 5,312,158 A * | 5/1994 | Wittig et al. | 297/362 |
| 5,611,599 A * | 3/1997 | Baloche et al. | 297/367 R |
| 5,690,386 A * | 11/1997 | Chabanne | 297/367 R |
| 6,024,410 A * | 2/2000 | Yoshida | 297/301.1 |
| 6,076,890 A * | 6/2000 | Yoshida et al. | 297/378.12 |
| 6,164,723 A * | 12/2000 | Ganot | 297/378.12 |

(Continued)

FOREIGN PATENT DOCUMENTS

| | | |
|---|---|---|
| CN | 1907752 A | 2/2007 |
| CN | 101148152 A | 3/2008 |

(Continued)

OTHER PUBLICATIONS

German Patent & Trademark office, Office Action for DE 10 2010 042 057.3, English Machine Translation attached to original, German Office Action mailed Jul. 13, 2011. All together 8 Pages.

(Continued)

*Primary Examiner* — David R Dunn
*Assistant Examiner* — Tania Abraham
(74) *Attorney, Agent, or Firm* — Brooks Kushman P. C.

(57) ABSTRACT

A recliner assembly for a vehicle seat that has a pair of adjustable recliners are disposed on opposite sides of the seat that connect a seat back to a seat base. The recliners are shifted between a locked position and an unlocked position by manually pivoting a connector rod. Each recliner has a gear plate and a guide plate that are each associated with one of the seat base and seat back. An easy entry module is also provided to release the seat back to pivot over the seat base to provide access to an area behind the seat back. A static connector may be provided that connects the gear plates of each of the pair of recliners and retains the gear plates of each recliner in alignment with the corresponding gear plate of the other recliner.

12 Claims, 5 Drawing Sheets

(56) References Cited

U.S. PATENT DOCUMENTS

| | | | |
|---|---|---|---|
| 6,402,249 B1 * | 6/2002 | Rohee et al. | 297/367 R |
| 6,712,429 B2 | 3/2004 | Villarroel | |
| 7,150,502 B2 | 12/2006 | Toba et al. | |
| 7,357,455 B2 * | 4/2008 | Becker et al. | 297/378.12 |
| 7,434,885 B2 * | 10/2008 | Becker et al. | 297/378.12 |
| 7,503,099 B2 * | 3/2009 | Pejathaya | 16/324 |
| 7,513,573 B2 * | 4/2009 | Wahls et al. | 297/362 |
| 7,513,574 B2 * | 4/2009 | Nagayama et al. | 297/452.18 |
| 7,517,021 B2 | 4/2009 | Wahls et al. | |
| 7,726,742 B2 | 6/2010 | Keyser et al. | |
| 7,837,268 B2 * | 11/2010 | Becker et al. | 297/378.12 |
| 7,992,938 B2 * | 8/2011 | Kojima et al. | 297/354.12 |
| 2007/0029860 A1 | 2/2007 | Yamada | |
| 2008/0047106 A1 * | 2/2008 | Burckhard et al. | 16/382 |
| 2008/0073961 A1 | 3/2008 | Wahls et al. | |
| 2010/0308635 A1 * | 12/2010 | Tame et al. | 297/367 P |

FOREIGN PATENT DOCUMENTS

| | | |
|---|---|---|
| CN | 101269630 A | 9/2008 |
| DE | 102005060218 A1 | 4/2007 |
| DE | 102008014473 A1 | 9/2009 |
| WO | 2010012101 A1 | 2/2010 |

OTHER PUBLICATIONS

Chinese Office Action, Application No. 201110303921.1, dated Jan. 23, 2014, 7 pages.

* cited by examiner

SYNCHRONIZER FOR MANUAL RECLINER

CROSS-REFERENCE TO RELATED APPLICATIONS

This application claims foreign priority benefits under 35 U.S.C. §119(a)-(d) to DE 10 2010 042 057.3, filed Oct. 6, 2010, which is hereby incorporated by reference in its entirety.

BACKGROUND OF THE INVENTION

1. Field of the Invention

This invention relates to vehicle seat recliner mechanisms that are adjustable to permit a seat back to be held at a desired angular orientation relative to a seat base and that also include an easy entry latch that may be actuated to permit the seat back to be folded over the seat base.

2. Background

Vehicle seats may be provided with tilt adjustment mechanisms that allow a seat back to be retained at a comfortable angle of inclination relative to a seat base. Vehicles seats may also have easy entry, or dump, latches that permit a seat back to be released and folded forward over the seat base to permit access to a space behind the seat.

Manual tilt adjustments mechanisms, also referred to a discontinuous tilt adjustment mechanisms, may have a gear plate and a guide plate that are selectively interlocked by a plurality of locking pawls at a selected angular orientation. The pawls may be released and re-engaged to change the angle of the seat back. Various approaches to preventing the pawls from re-engaging the gear plates in predetermined angular orientations are available such as pins that are received in a guide plate, portions of the gear plate that do not have teeth, end stops attached to the gear plate, and the like.

Easy entry latches are provided that may be actuated to permit the seat back to be folded over the seat base. Generally, the easy entry latches and the tilt adjustment mechanisms are separately and independently operated. However, the recliners on opposite sides of the seat may become circumferentially offset relative to each other if the easy entry latch is actuated at the same time that the tilt adjustment mechanism is released. If the recliners are circumferentially offset, the areas that the pawls are prevented from re-engaging may become misaligned and the free travel or dead zones where the seats are not intended to be positioned may become misaligned.

Applicants have attempted to resolve the above problem and other problems that will be apparent to one of ordinary skill in the art as summarized below.

SUMMARY OF THE INVENTION

According to one aspect of the invention, a vehicle seat is provided with a hinge assembly that connects a seat back to a seat base. The hinge assembly includes a pair of adjustable recliners that are disposed on opposite sides of the seat that may be shifted between a locked position and an unlocked position by manually pivoting a connector rod. Each recliner has a pivoting part and a stationary part that are attached to either the seat base or seat back. The hinge assembly also includes an easy entry module that may be actuated to release the seat back to pivot over the seat base to provide access to an area behind the seat back. A synchronizer connects the pair of recliners to retain one of the parts of each recliner in alignment with the corresponding part of the other recliner.

According to another aspect of the invention, a recliner assembly is provided for a vehicle seat that has a seat base and a seat back. Each of a pair of adjustable recliners are disposed on opposite sides of the seat that connect the seat back to the seat base. The recliners may be shifted between a locked position and an unlocked position by manually pivoting a connector rod. Each recliner has a gear plate and a guide plate that are attached to either the seat base or seat back. An easy entry module is also provided to release the seat back to pivot over the seat base to provide access to an area behind the seat back. A static connector may be provided that connects the gear plates of each of the pair of recliners and retains the gear plates of each recliner in alignment with the corresponding gear plate of the other recliner.

According to other aspects of the invention, the synchronizer, or static connector, may be a tubular member that is operatively connected to both of the recliners. A pair of locking rings may be provided that are each fixed to one of the pivoting plates, such as the gear plates, and the tubular member. A pair of adaptors may be connected between the tubular member and the locking rings. The synchronizer may be a tube that receives the connector rod that is used to release and re-engage the adjuster inside the tube.

According to another aspect of the invention, the recliner may include a pivoting part that is a gear plate and a stationary part that is a guide plate. A plurality of pawls may be guided by the guide plate between a first position corresponding to the locked position in which the pawls engage the gear plate and a second position corresponding to the unlocked position in which the pawls are disengaged from the gear plate. The adjustable recliners may have a gear plate that is provided with stops, or non-toothed portions, that prevent engagement of the plurality of pawls during a portion of the range of potential positions of the seat back relative to the seat base. The synchronizer, or static connector, retains stops on the gear plates of each recliner in alignment.

Another aspect of the invention relating to the easy entry module is it may include a locking module that locks the seat back to the recliners in a normal position. The latching module is actuated to release the seat back from the recliners to allow the seat back to pivot over the seat base. The easy entry module may be actuated and the recliners may be released at the same time and the synchronizer will maintain the recliners in alignment with each other.

The above aspects of the invention and other aspects will be better understood in view of the attached drawings and the following detailed description of the illustrated embodiments.

DETAILED DESCRIPTION OF THE PREFERRED EMBODIMENT(S)

A detailed embodiment of the present invention is disclosed below. The disclosed embodiment is merely an example of the invention that may be embodied in various and alternative forms. The figures are not necessarily to scale, some features may be exaggerated or minimized to show details of particular components. The specific structural and functional details disclosed are not to be interpreted as limiting the claims. The disclosed embodiment is a representative basis for teaching one skilled in the art how to practice the invention.

Figure 1:
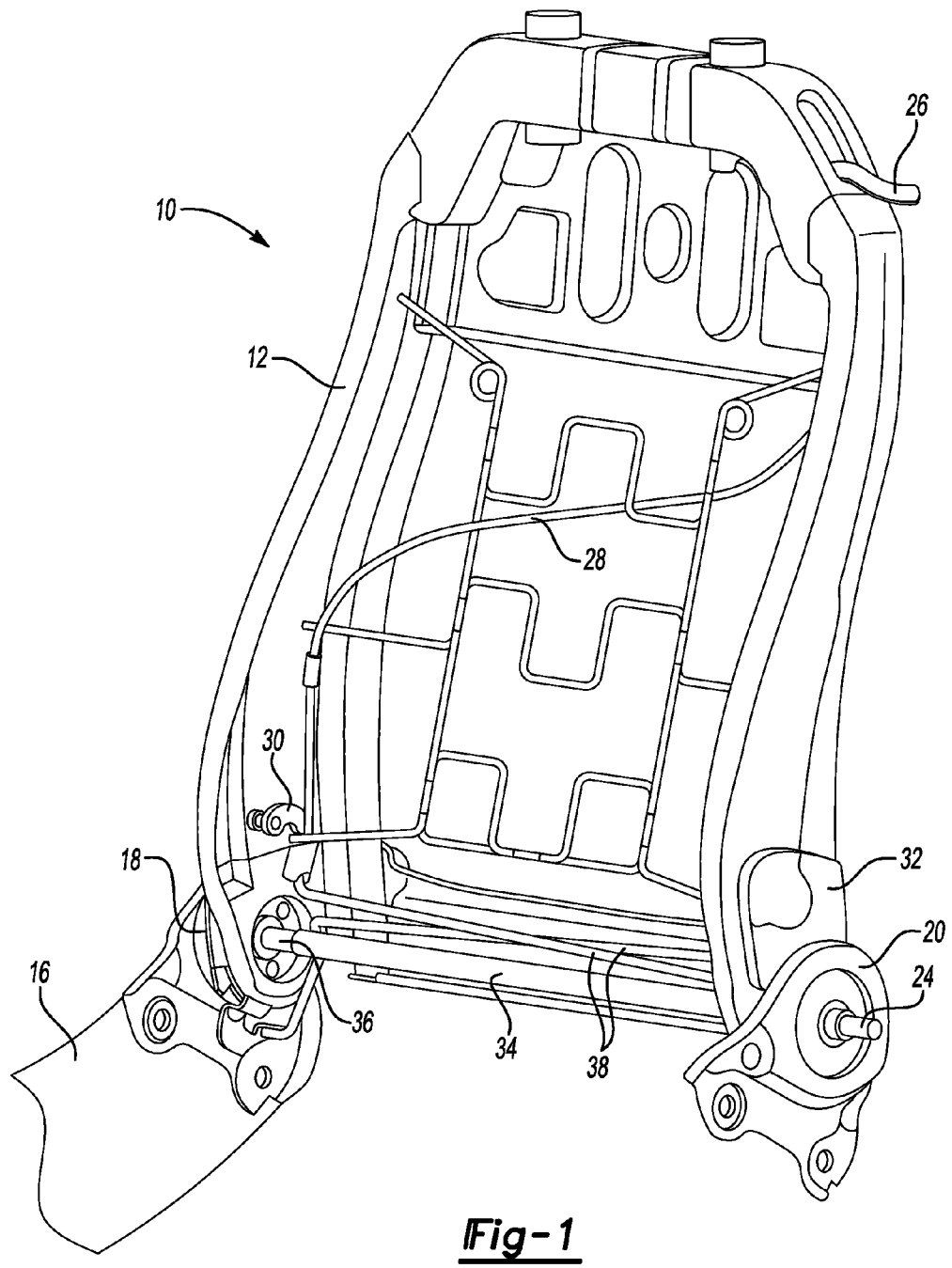
FIG. 1 is a fragmentary perspective view of portions of a vehicle seat.

Referring to FIG. 1, a vehicle seat 10 is illustrated that includes a seat back 12 and a seat base 16 that are connected by an inboard recliner 18 and an outboard recliner 20. The inboard recliner 18 and outboard recliner 20 are connected by a recliner release rod 24, or connector rod, that is used to coordinate release and locking of the inboard recliner 18 and outboard recliner 20.

An easy entry release handle 26 is used to fold the seat back 12 over the seat base 16 when it is desired to provide access to the space behind the vehicle seat 10. The easy entry release handle 26 is connected by one or more control cables 18 to an internal release lever 30. The release lever 30 is pivoted to release the easy entry locking module 32.

A synchronizer tube 34 is assembled over the recliner release rod 24. Two adapters 36 are provided on opposite ends of the synchronizer tube 34. Torsion rods 38 are assembled to the seat back 12, inboard recliner 18 and outboard recliner 20 to bias the seat back 12 to a neutral position.

Figure 2:
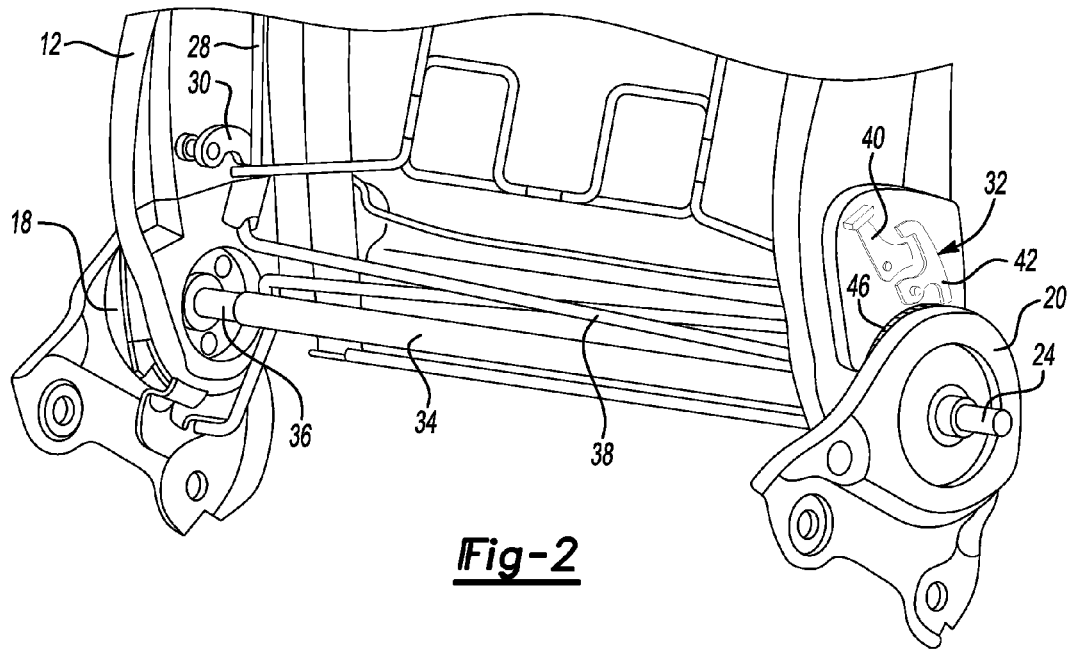
FIG. 2 is a fragmentary perspective view of the recliner and connecting rod for the vehicle seat shown in FIG. 1.
Figure 3:
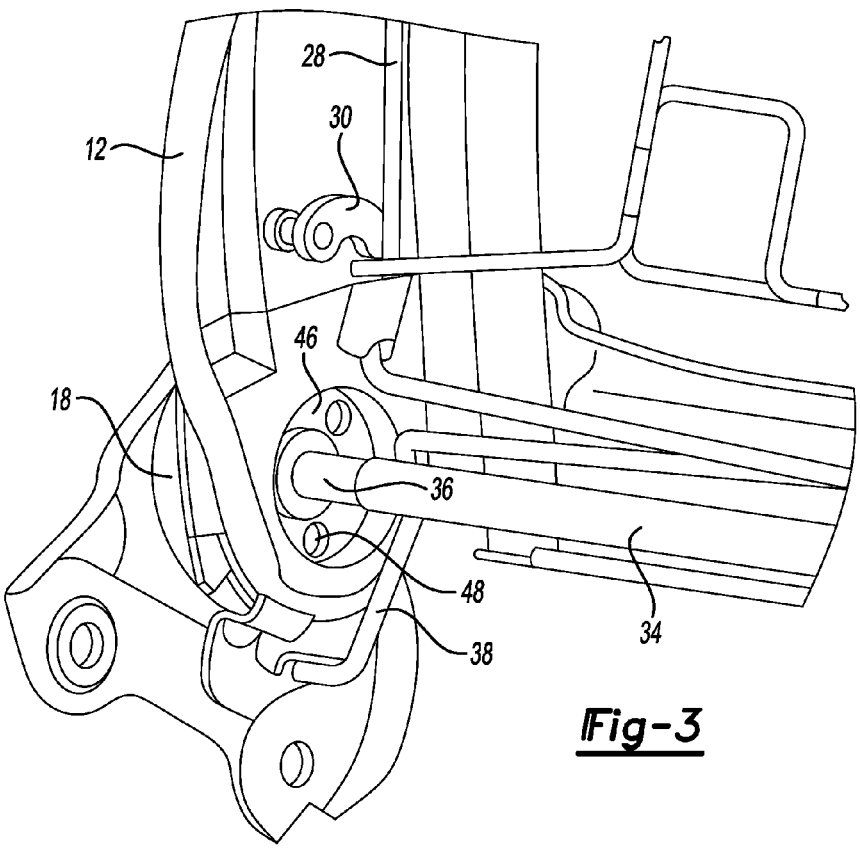
FIG. 3 is a fragmentary perspective view of an inboard recliner for the vehicle seat shown in FIG. 1.

Referring to FIGS. 2 and 3, the easy entry lock module 32 includes a locking cam 40 that cooperates with an easy entry release pawl 42. The easy entry release pawl 42 engages an easy entry locking ring 46 to lock the easy entry locking module 32 into its locked position. When the easy entry release handle 26 is actuated, the easy entry locking module 32 is released by disengaging the easy entry release pawl 42 from the easy entry locking ring 46 which allows the seat back to be pivoted to the easy entry position over the seat base 16.

Figure 4:
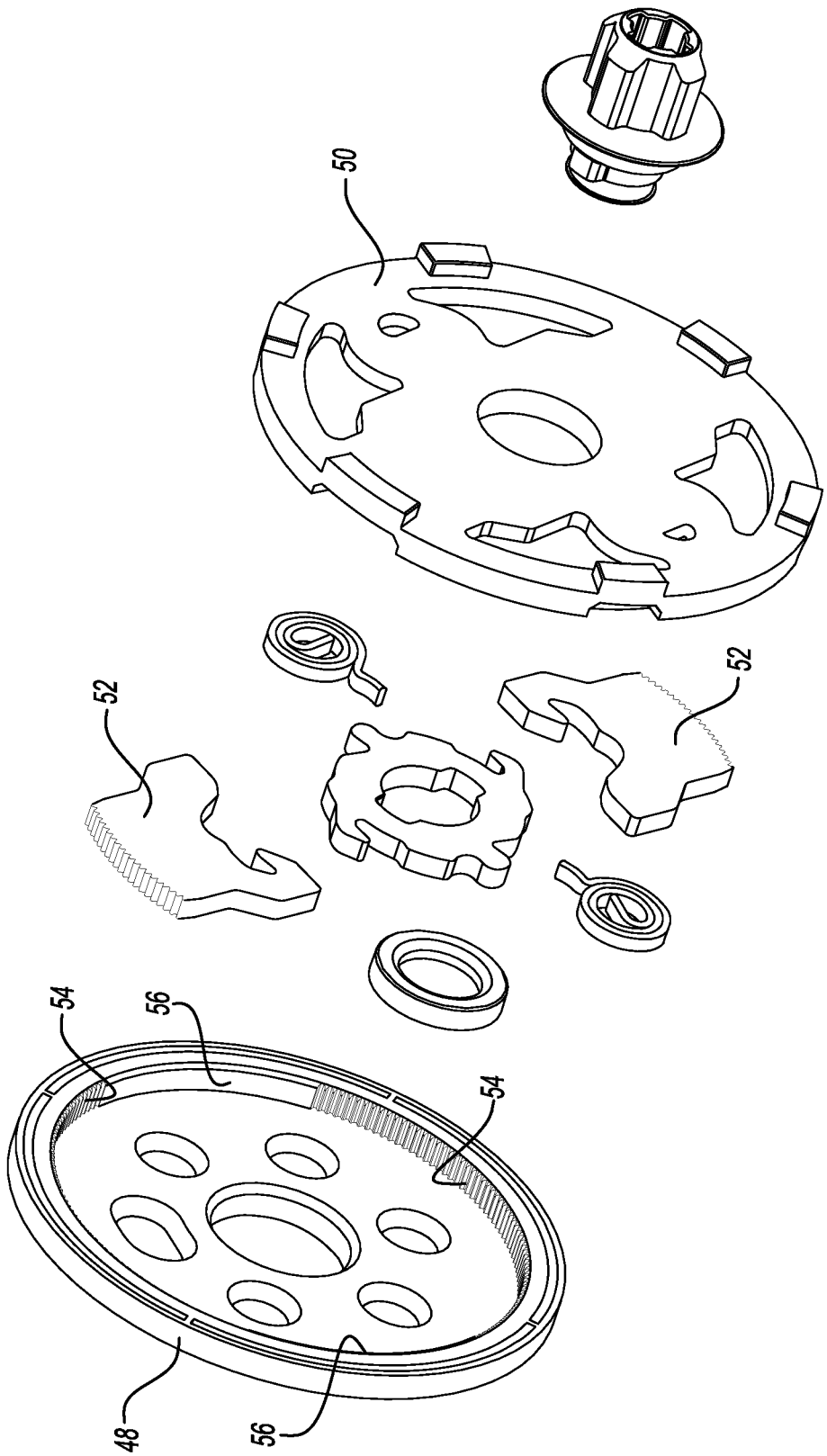
FIG. 4 is a exploded perspective view of a discontinuous recliner mechanism that may be used with the present invention.

The inboard recliner 18 and outboard recliner 20 are mirror images of each other. Referring to FIG. 4, each recliner includes a recliner gear plate 48 and a recliner guide plate 50 that are selectively locked and unlocked by recliner locking pawls 52. The recliner locking pawls 52 are guided by the recliner guide plate 50 to engage and disengage the teeth 54 formed on the recliner gear plate 48. The teeth 54 provided on the recliner gear plate are separated by stops 56, or non-tooth portions, that may not be engaged by the recliner locking pawls 52.

Figure 5:
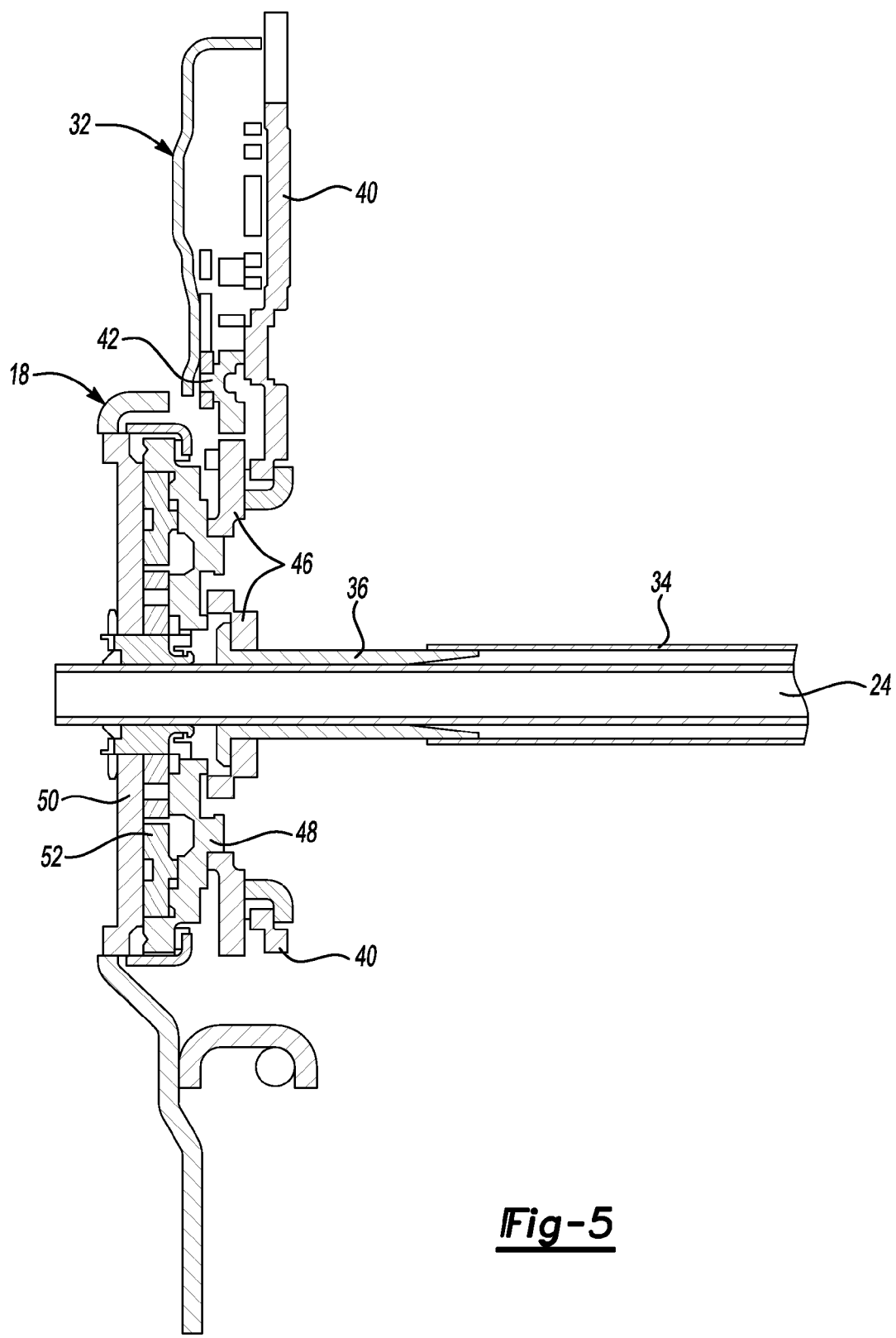
FIG. 5 is a cross-sectional view of a recliner mechanism, easy entry release, connecting rod and static connector made according to one embodiment of the present invention.

Referring to FIG. 5, the inboard recliner 18 is shown attached to the recliner release rod 24 and the synchronizer tube 34. The synchronizer tube 34 is connected to the easy entry locking ring 46 by one of the adapters 36. The adapter 36 is attached to the easy entry locking ring 46 in a fixed relationship and may be welded to the locking ring 46. The synchronizer tube is spliced to the adapter 36 during the seat assembly process. The synchronizer tube 34 is connected to the locking ring 46 of the outboard recliner 20 in a similar, but mirror image, arrangement.

The synchronizer tube 34 retains the recliner gear plate 48 and the easy entry locking rings 46 of both the inboard recliner 18 and outboard recliner 20 in a matching rotary relationship to each other. The recliner gear plate 48 is fixedly attached to the easy entry locking ring 46. The locking ring 46 may be welded, press fit, or otherwise attached to the recliner gear plate 48. By fixedly attaching the gear plate 48 to the locking ring 46, the gear plates 48 on both the inboard recliner 18 and outboard recliner 20 remain in alignment with each other regardless of the position of the internal release lever 30 or the recliners 18 and 20.

Figure 6:
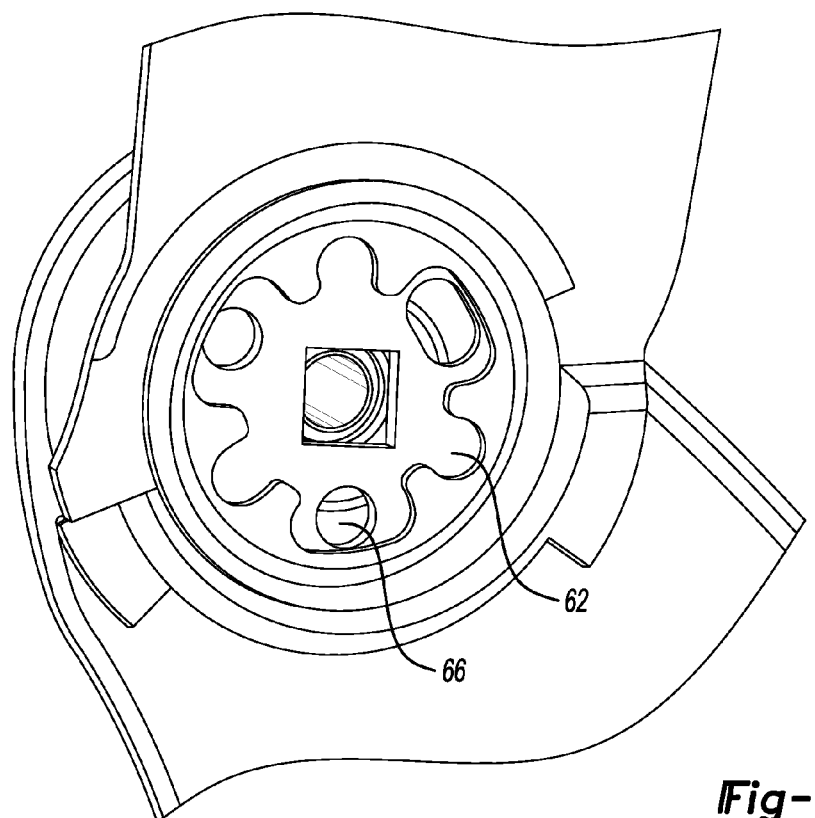
FIG. 6 is a perspective view of the outer side of a recliner mechanism made according to an alternative embodiment of the present invention.
Figure 7:
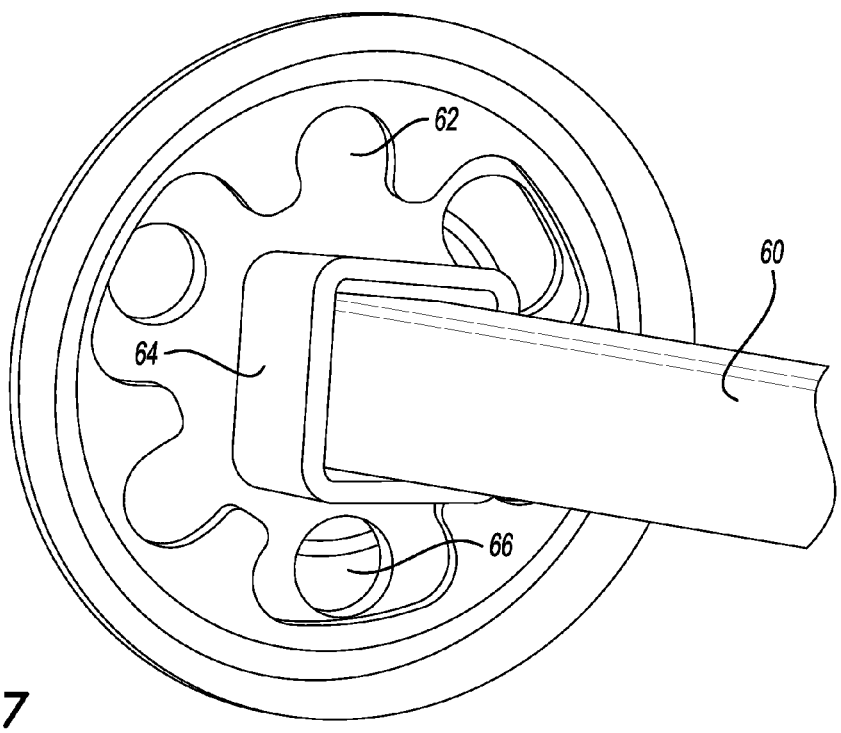
FIG. 7 is a perspective view of the inner side of a recliner mechanism made according to the alternative embodiment of the present invention shown in FIG. 6.

Referring to FIGS. 6 and 7, an alternative embodiment of the connection between the synchronizer tube 60 and recliner gear plate 62 is illustrated that includes a receptacle 64. The synchronizer 60 is square in cross-section and is received in the square cross-section receptacle 64. Other tubular profiles may be used to make the synchronizer tube 60. It is also possible to make a solid synchronizer that extends between and synchronizes the positioning of the two recliner gear plates 62. The recliner guide plate 66 may be selectively locked to the gear plate 62 as described with reference to FIG. 5 above. Other recliner mechanisms may be used with the synchronizer tube 60 or 34 without departing from the scope of the invention.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A vehicle seat comprising:
   a seat base;
   a seat back attached to the seat base:
   a hinge assembly connects the seat back to the seat base and includes a pair of adjustable recliners that are disposed on opposite sides of the seat that are shifted between a locked position and an unlocked position by manually pivoting a connector rod, wherein each recliner has a pivoting part and a stationary part that are each associated with one of the seat base and seat back, the hinge assembly further including an easy entry lock module that may be actuated to release the seat back to pivot over the seat base to provide access to an area behind the seat back; and
   a synchronizer affixes each of the pivoting parts of the pair of recliners together to retain the pivoting part of each recliner in alignment with the corresponding pivoting part of the other recliner, wherein the synchronizer is a tube extending between the pair of adjustable recliners and that receives the connector rod inside the tube; and
   the easy entry lock module comprises a pair of locking rings that are each fixed to one of the pivoting parts, concentric to the connector rod, and operatively connected to the tube.

2. The vehicle seat of claim 1 further comprising a pair of adaptors that are connected between the tube and the pair of locking rings.

3. The vehicle seat of claim 1 wherein the pivoting part of the recliner is a gear plate and the stationary part of the recliner is a guide plate, and wherein a plurality of pawls are guided by the guide plate between a first position corresponding to the locked position in which the pawls engage the gear plate and a second position corresponding to the unlocked position in which the pawls are disengaged from the gear plate.

4. The vehicle seat of claim 1 wherein the adjustable recliners have a gear plate that is provided with a plurality of stops that prevent engagement of a plurality of pawls during a portion of the range of potential positions of the seat back relative to the seat base, and wherein the synchronizer aligns the stops on the gear plates of each recliner.

5. The vehicle seat of claim 1 wherein the easy entry lock module includes a locking module that locks the seat back to the recliners in a normal position and that releases the seat back from the recliners to allow the seat back to pivot over the seat base when actuated independently of the recliners.

6. The vehicle seat of claim 5 wherein the easy entry assembly may be actuated and the recliners may be released to permit adjustment at the same time, wherein the synchronizer aligns the recliners with each other.

7. A recliner assembly for a vehicle seat having a seat base and a seat back, the recliner apparatus comprising:
   a pair of adjustable recliners that are disposed on opposite sides of the seat that connect the seat back to the seat base, wherein the recliners are shifted between a locked position and an unlocked position by manually pivoting a connector rod, and wherein each recliner has a gear plate and a guide plate that are each associated with one of the seat base and seat back;
   an easy entry module that may be actuated to release the seat back to pivot over the seat base to provide access to an area behind the seat back; and
   a static connector that affixes each of the gear plates of each of the pair of recliners together to retain the gear plates of each recliner in alignment with the corresponding gear plate of the other recliner wherein the static connector is a tube extending between the pair of adjustable recliners and that receives the connector rod inside the tube; and further comprising a pair of locking rings that are each fixed to one of the gear plates concentric to the connector rod and the tube.

8. The recliner assembly of claim 7 further comprising a pair of adaptors that are connected between the tube and the pair of locking rings.

9. The recliner assembly of claim 7 wherein a plurality of pawls are guided by the guide plate between a first position corresponding to the locked position in which the pawls engage the gear plate and a second position corresponding to the unlocked position in which the pawls are disengaged from the gear plate.

10. The recliner assembly of claim 7 wherein the gear plates are provided with a plurality of stops that prevent engagement of a plurality of pawls during a portion of the range of potential positions of the seat back relative to the seat base, and wherein the static connector retains the stops on the gear plates of each recliner in alignment.

11. The recliner assembly of claim 7 wherein the easy entry module includes a locking module that locks the seat back to the recliners in a normal position and that releases the seat back from the recliners to allow the seat back to pivot over the seat base when actuated independently of the recliners.

12. The recliner assembly of claim 11 wherein the easy entry module may be actuated and the recliners may be released to permit adjustment at the same time, wherein the static connector aligns the recliners with each other.

* * * * *